Nov. 26, 1963    K. S. REED    3,111,709
FEED MECHANISM
Filed May 20, 1960

INVENTOR.
KENNETH S. REED
BY
Ezekiel Wolf, Wolf & Greenfield
ATTORNEYS 3,111,709
FEED MECHANISM
Kenneth S. Reed, Wichita, Kans., assignor to Tru-Scale, Inc., Wichita, Kans., a corporation of Kansas
Filed May 20, 1960, Ser. No. 32,504
3 Claims. (Cl. 18—5)

The present invention relates to a feed and associate mechanism for use in connection with rapid feeding of foamable or similar material into a processing machine, and more particularly, a mechanism for use in connection with and for feeding foamable material into a panel-forming machine such as the laminating machine described in copending patent application Serial No. 848,996, filed October 27, 1959, by Perry H. Pelley, entitled, Means and Method for the Formation of Paneling Having a Foamed Plastic Core.

Laminating machines such as described in the copending application Serial No. 848,996, require a continuous rapid feed if huge amounts of foamable materials such as polystyrene beads, for the most efficient operation and maximization of output of such machines. The beads are fed continuously between a pair of paper liners into a confined foaming area wherein they are foamed by contact with steam injected through a set of probes. Conventional feed means are inadequate for such operation. Use of feed means heretofore known result in a non-homogeneous end product and/or reduce the production rate of the processing machine to an unacceptable level.

In addition the feed mechanism described in application Serial Number 848,996 allows back pressure of steam to inhibit the fast flow of beads to and between the webs. This substantially slows the feed rate of the beads and therefore the machine's operation. It also results in occasional voids in the finished product.

The present invention is designed to overcome these problems and permit such processing machines to operate at maximum capacity in producing a flawless end product.

The present invention is also designed to permit additional control means for varying and controlling the production rate of such machines.

These and other objects and advantages of the present invention will be more clearly understood when considered in conjunction with the accompanying drawings, in which.

Figure 1:
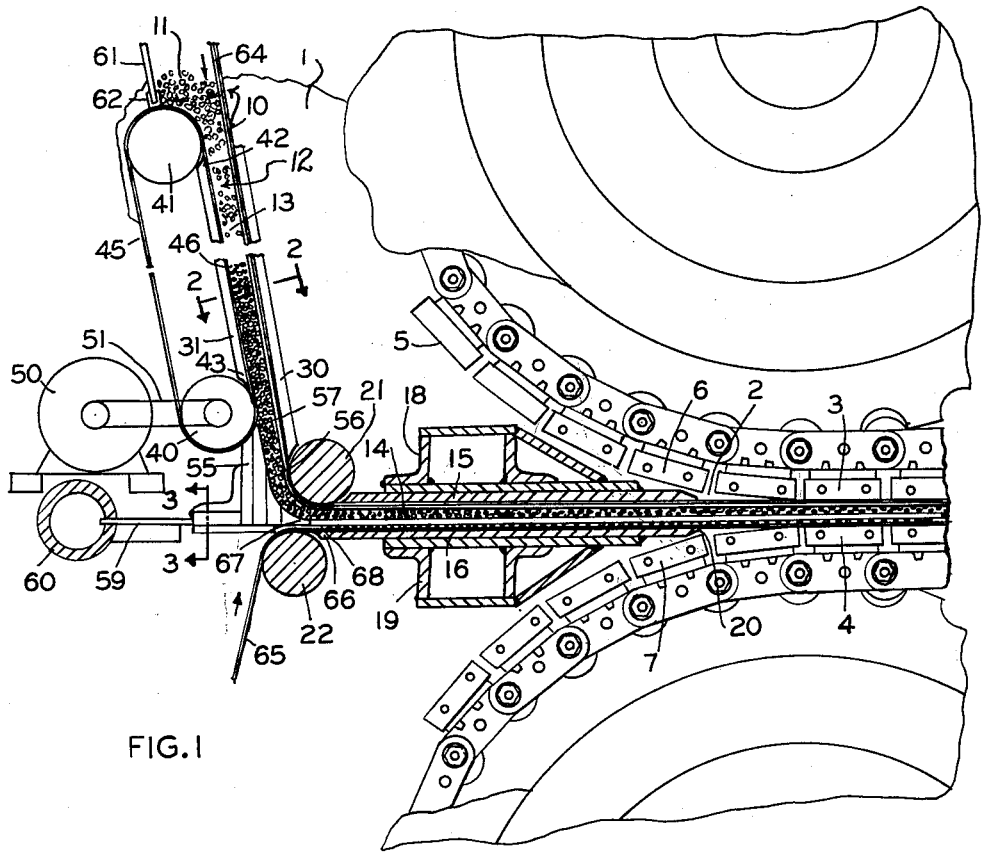
FIG. 1 is a cross sectional elevation of the feed mechanism and a portion of the forward end of the feed processing machine.
Figures 2, 3:
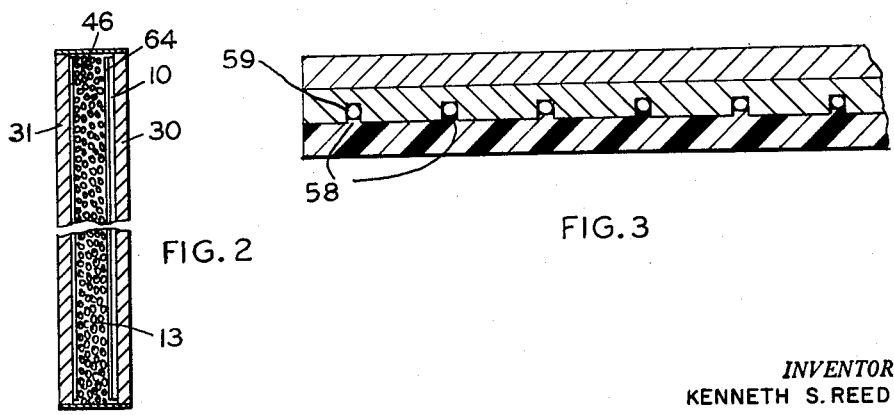
FIG. 2 is a cross section taken along the line 2—2 of FIG. 1.
FIG. 3 is a detail taken along the line 3—3 of FIG. 1.

The invention is described in connection with its use for a machine of the type described in copending application Serial No. 848,996. This mechanism may, however, be used in conjunction with similar machines of other design, where it is necessary to feed large quantities of foamable material into a processing machine.

The feed mechanism is suitably supported on a frame 1 at the forward end of the laminating machine with the feed mechanism projecting into the wide mouth opening 2 of the laminating machine. The opening 2 is formed by the spaced parallel portions 6 and 7 respectively at the forward end 5 of the belts 3 and 4. These belts converge to define a restricted area of limited height within which the foamable material expands to form a laminated structure between two moving webs 64 and 65 as is described in the copending application.

A hopper 10 containing a large supply of partially pre-expanded beads 11 is positioned above and forward of the wide mouth opening 2. This hopper extends preferably the width of the opening 2. An elongated passage 12 interconnects the bottom open end of the hopper 10 with the mouth opening 2. This passage 12 is formed with an upwardly extending section 13 continuous with a transverse section 14. The transverse section 14 is formed by a set of parallel upper and lower restraining plates 15 and 16 respectively extending the width of the opening 2. These plates are suitably secured to the frame by means of steel assemblies or beams 18 and 19. The rear edges of the restraining plates 15 and 16 project deeply into the mouth opening 2 and terminate quite close to the nip of belts 3 and 4 as indicated at 20. A pair of idler rolls 21 and 22 suitably journaled at their ends in the frame 1 are positioned respectively adjacent the forward edges of the plates 15 and 16. Idler roll 21 is in tangential alignment with the lower surface of plate 15 while idler roll 22 is in tangential alignment with the upper surface of plate 16.

The upwardly extending section 13 is formed in part by the parallel feed plates 30 and 31 which form respectively the rear and front wall of the upwardly extending section 13. Plate 30 terminates at its lower edge immediately adjacent and parallel to idler roll 21. Similar to plate 15, the forward surface of plate 30 is tangential to the idler roll 21. The upper end of plate 30 extends upwardly to and is continuous with the rear wall of the hopper 10.

The feed plate 31 which forms the front wall of the passage is positioned between the variable speed drive roll 40 and idler roll 41. These rolls are suitably parallelly journaled in the frame 1. The rear surface 46 of the plate 31 is tangential with both idler roll 41 and drive roll 40. An endless feed belt 45 extends around both idler roll 41 and drive roll 40 with the feed belt 45 passing over the rear surface 46. The feed belt 45 extends the width of the upwardly extending section 13. As viewed in FIG. 1, the endless belt 45 is moved in a clockwise direction by suitable drive-means which may comprise a variable speed drive motor 50 operatively interengaged with the drive roll 40 through the chain drive 51.

Interposed between variable speed drive roll 40 and idler roll 22 is the arcuate guide member 55. This arcuate guide member 55 extends between the side walls which in part form the frame. The upper end 57 of the member 55 is continuous with the lower end of the belt 45 and the lower end of the member 55 is continuous with the forward end of the restraining plate 16. The guide member is formed with a rear arcuate surface 56 partially parallel to the surface of idler roll 21. The guide member 55 which is suitably secured to the frame is provided with a plurality of parallel horizontal holes 58 aligned with the mouth-opening 2. Steam probes 59 project through these holes 58. The rear end of the steam probes 59 project well into the mouth opening 2 between the parallel portions of the endless belts. The forward ends of the probes 59 are connected to the steam plenum 60. The steam plenum may be suitably supported and fed in a manner as described in the copending application.

The inner surface of the sides of the frames form the sides of the upwardly extending section and transverse section of the passage 12. The passage 12 is substantially closed along its entire length from the hopper to the mouth 2. The front wall of the passage is formed as a moving surface or wall by the downwardly moving portion of the endless feed belt 45. The upwardly extending section 13 of the passage 12 is inclined slightly forwardly from its lower end to its upper end. The forward wall 61 of the hopper is sealed at its lower edge by a suitable seal 62 which terminates in a substantial wiping contact with the belt 45 on the idler roll 41.

The paper webs 64 and 65 are fed through the passage

12. These webs may be suitably mounted on rolls and fed over a series of idler rolls, not shown. Web 64 passes downwardly through the upper end of the passage and is held in close relation with the forward surface of restraining plate 30 in the upwardly extending section 13. This web passes over idler roll 21 and the lower surface of restraining plate 15. The polystyrene beads 11 pass down from the hopper between the web 64 and the endless feed belt 45. The other web 65 enters the passage 12 through a slot 68 formed between the forward edge 66 of the plate 16 and the rear edge 67 of the guide member 55. This slot extends across the width of the passage. The web 65 rests on the upper surface of the restraining plate 16 and supports the polystyrene beads as they pass into the mouth opening 2.

In the operation of this mechanism, the polystyrene beads fed from the hopper 10, pass downwardly along the inclined upper extending section 13 both under the force of gravity and under the influence of the moving feed belt 45. In order to sufficiently accelerate the downward movement of the beads, the feed belt 45 may be moving at a rate faster than the web 64 or the web 65. It has been found that this acceleration of the feed of the preexpanded beads is sufficient to operate the processing machine at satisfactory desired speeds.

What is claimed is:

1. A mechanism for feeding into a reaction space, confined between converging belts of a continuous laminating machine, a pair of webs and an intermediate layer of foamable beads which comprises a hopper for said beads located above the level of said reaction space, a pair of feed plates extending downwardly from said hopper and constituting the side walls of a vertically oriented portion of a feed channel, a pair of opposed restraining plates having their rear ends between the converging belts of the laminating machine and their forward ends adjacent the lower ends of said feed plates and forming between them a transverse continuation of said feed channel, means for advancing one of said webs continuously along the inner surface of one of said restraining plates, and means for advancing the other web continuously downwardly through said vertically oriented feed channel in contact with a side wall thereof and then laterally through its transverse continuation in contact with the other of said restraining plates, whereby a position flow of beads to the laminating machine is ensured by the combined action of gravity and the downward motion of the web in the vertically oriented feed channel.

2. A mechanism for feeding into a reaction space, confined between converging belts of a continuous laminating machine, an upper web, a lower web, and an intermediate layer of foamable beads which comprises a hopper for said beads located above the level of said reaction space, forward and rear feed plates extending downwardly from said hopper and constituting the side walls of a vertically oriented portion of a feed channel, a pair of opposed upper and lower restraining plates having their rear ends between the converging belts of the laminating machine and their forward ends adjacent the lower ends of said feed plates and forming between them a transverse continuation of said feed channel, means for advancing said lower web continuously along the inner surface of the lower restraining plate, and means for advancing said upper web continuously downwardly through said vertically oriented feed channel in contact with the rear feed plate and then laterally through its transverse continuation in contact with the upper restraining plate, whereby a positive flow of beads to the laminating machine is ensured by the combined action of gravity and the downward motion of the web in the vertically oriented feed channel.

3. A mechanism for feeding into a reaction space, confined between converging belts of a continuous laminating machine, a pair of webs and an intermediate layer of foamable beads which comprises a hopper for said beads located above the level of said reaction space, opposed forward and rear feed plates extending downwardly from said hopper and constituting the side walls of a vertically oriented portion of a feed channel leading therefrom, a pair of opposed upper and lower restraining plates having their rear ends between the converging belts of the laminating machine and with the forward end of the upper plate adjacent the lower end of the rear feed plate, said restraining plates forming a transverse continuation of said feed channel, an arcuate guide member located between the lower restraining plate and the forward feed plate and containing horizontal openings in alignment with said feed channel for the admission of steam probes, means for admitting one of said webs adjacent said guide member and advancing it continuously along the inner surface of the lower restraining plate, and means for advancing the other web continuously downwardly through said vertically oriented feed channel in contact with the rear feed plate and then laterally through its transverse continuation in contact with the upper restraining plate, whereby a positive flow of beads to the laminating machine is ensured by the combined action of gravity and the downward motion of the web in said feed channel.

References Cited in the file of this patent

UNITED STATES PATENTS

| 1,465,326 | Zimmer | Aug. 21, 1923 |
| 2,728,939 | Behr | Jan. 3, 1956 |
| 2,898,632 | Irwin et al. | Aug. 11, 1959 |

FOREIGN PATENTS

| 218,151 | Australia | Nov. 4, 1958 |
| 1,165,798 | France | June 2, 1958 |